UNITED STATES PATENT OFFICE.

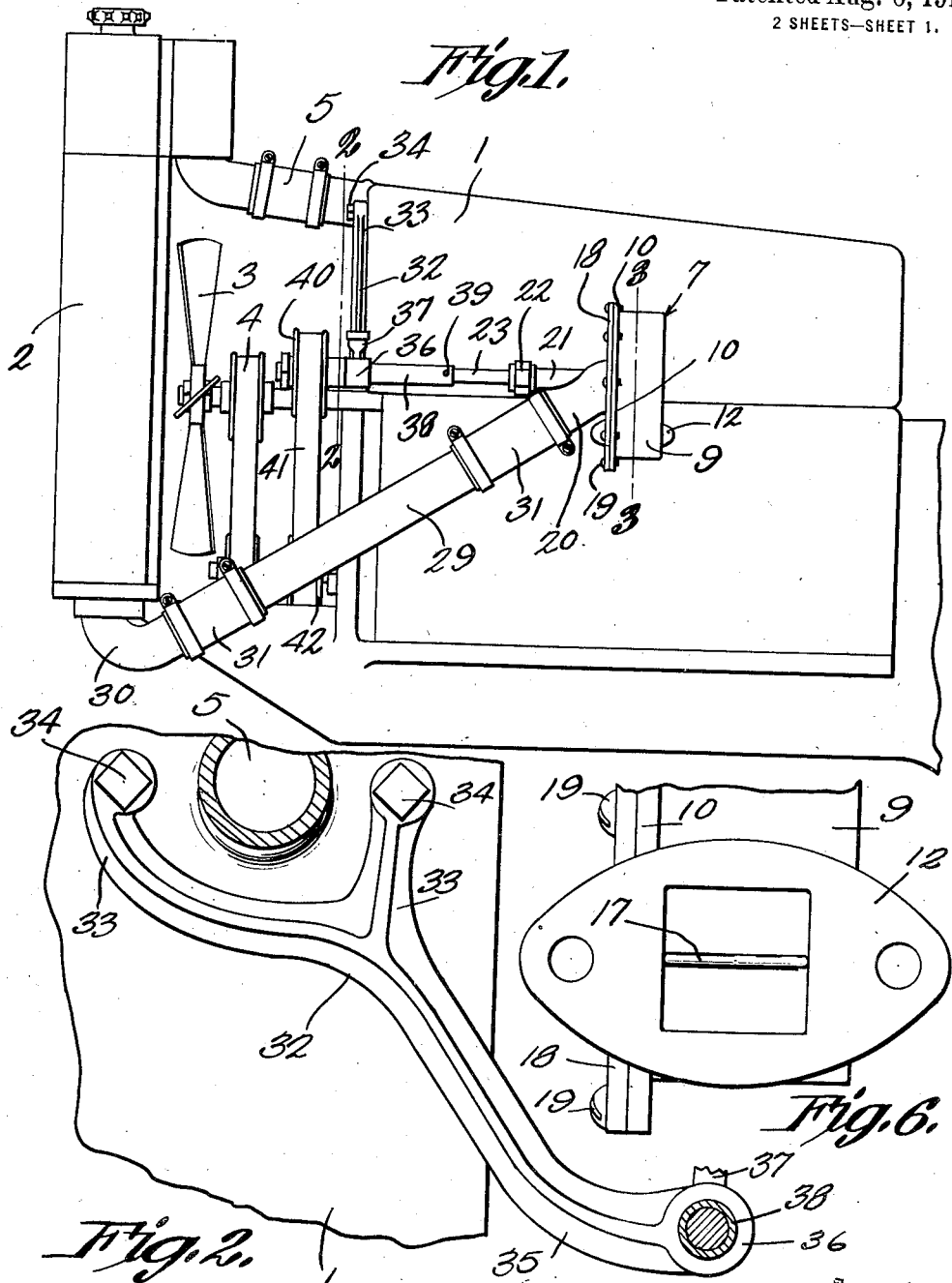

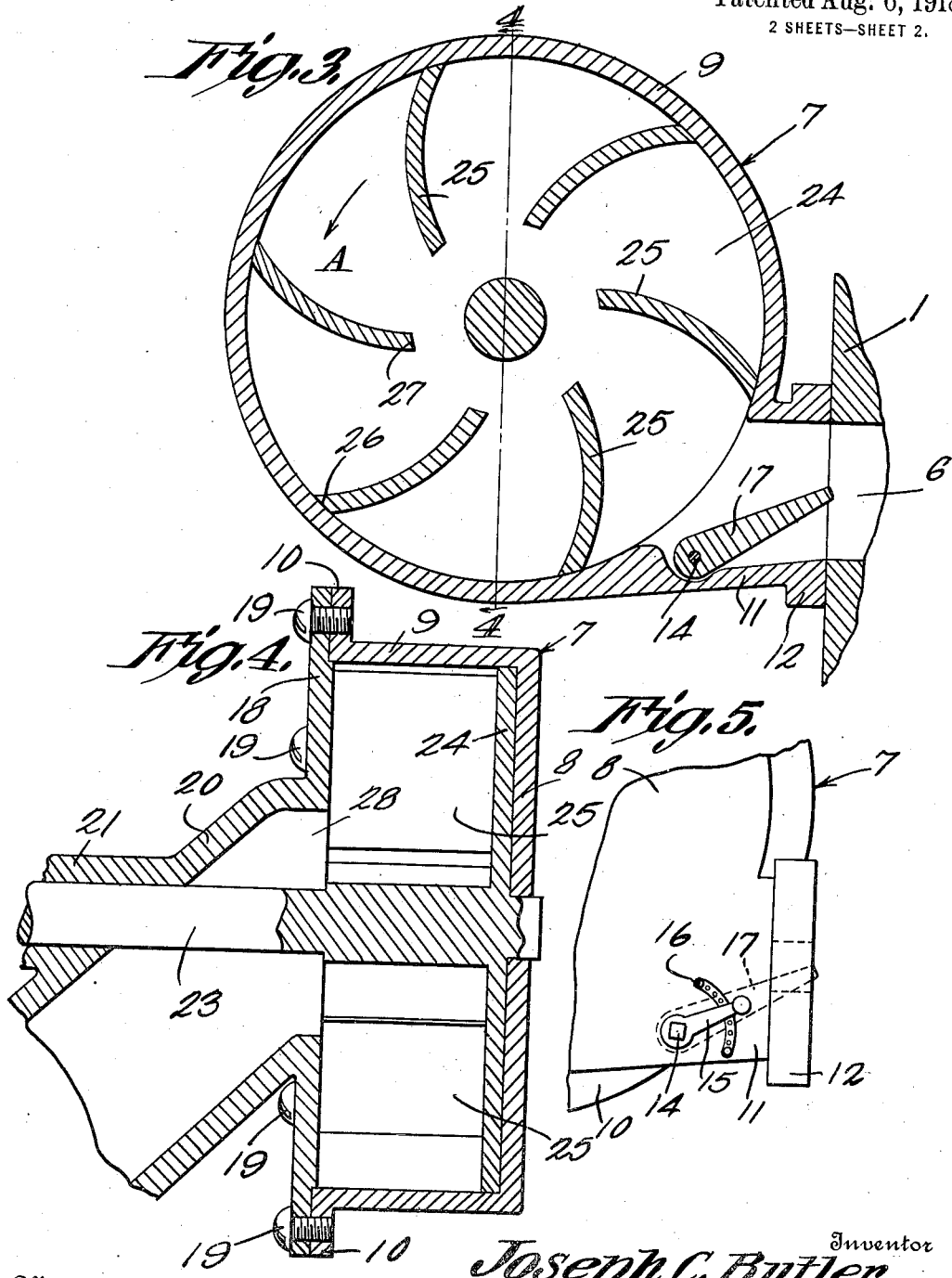

JOSEPH C. BUTLER, OF POMONA, CALIFORNIA.

WATER CIRCULATING AND COOLING PUMP.

1,274,678.  Specification of Letters Patent.  Patented Aug. 6, 1918.

Application filed January 29, 1917. Serial No. 145,237.

*To all whom it may concern:*

Be it known that I, JOSEPH C. BUTLER, a citizen of the United States, residing at Pomona, in the county of Los Angeles and State of California, have invented a new and useful Water Circulating and Cooling Pump, of which the following is a specification.

The device forming the subject matter of this application is adapted to constitute a part of the circulating system whereby water from the radiator of an internal combustion is conveyed to the cylinders of the engine.

The invention aims to provide novel means for promoting the circulation between the radiator and the cylinders of the engine, to improve the construction of the pump whereby such a circulation is secured, to provide novel means for driving the pump, to provide novel means for regulating the amount of water delivered by the pump into the cylinders and, generally, to improve and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—

Figure 1 shows in side elevation, a portion of an internal combustion engine whereunto the device forming the subject matter of this application has been applied;

Fig. 2 is a section taken approximately on the line 2—2 of Fig. 1, and showing, upon an enlarged scale, the means whereby the pump shaft is supported for rotation;

Fig. 3 is a section taken through the pump;

Fig. 4 is a section taken approximately on the line 4—4 of Fig. 3;

Fig. 5 is a fragmental elevation of the pump, showing the means whereby the gate is controlled; and Fig. 6 is an end elevation of the structure shown in Fig. 5.

In the drawings there is shown an engine of the kind used on motor propelled vehicles, the cylinders of the engine appearing at 1, and the numeral 2 indicating the radiator. The fan is shown at 3 and is driven in any suitable way, as indicated at 4, from the shaft of the engine. The return pipe between the engine cylinders 1 and the radiator 2 is marked by the reference numeral 5. The numeral 6 in Fig. 3 shows a port whereby water enters the engine cylinders 1.

The pump whereby a circulation between the radiator 2 and the engine cylinders 1 is secured, includes a cup-shaped member 7, comprising a back plate 8 and an annular wall 9 formed integrally with the back plate and provided with an outstanding marginal flange 10. The annular wall 9 of the pump casing is provided adjacent its lower portion with an outstanding neck 11, the bore of which preferably is of square outline. The neck 11 carries a foot plate 12 attached to the engine cylinder, the bore of the neck 11 communicating with the port 6, as clearly indicated in Fig. 3 of the drawings. Mounted to rock in the neck 11 is a shaft 14 operated by a lever 15 disposed exteriorly of the neck, and adapted to coöperate with a segment 16 carried by the neck. Attached to the shaft 14 and operating within the bore of the neck 11 is a gate 17. The pump casing includes a face plate 18 held to the flange 10 by means of securing elements 19 and provided with a depending inlet nipple 20 carrying a bearing boss 21 having a gland 22 at its outer end. Journaled in the boss 21 and in the back plate 8 of the pump casing is a shaft 23 which passes through the gland 22, the obvious function of the gland being to prevent a leakage about the shaft. Formed integrally with the shaft 23 and located within the cup-shaped member 7 of the pump casing is a disk 24 of approximately the same diameter as the back plate 8. Formed integrally with the disk 24 are radial, convexed blades 25, the outer edges of which move, as shown at 26, in close relation to the inner surface of the annular wall 9 of the cup-shaped member of the pump casing. As shown at 27, the inner ends of the blades 25 terminate at the circumference of an opening 28 in the face plate 18, the openings 28 representing the inner end of the bore of the inlet nipple 20. A tube 29 extends between the inlet nipple 20 of the pump casing and the outlet 30 of the radiator 2, suitable clamping means 31, of any desired kind, being employed for holding the ends of the tube 29 on the parts 20 and 30.

Mounted on the forward end of the engine is a bracket 32 including upstanding arms 33 attached by securing elements 34 to the engine. The bracket 32 includes a downwardly extended arm 35, terminating in a bearing 36 carrying an oil cup 37. Journaled for rotation in the bearing 36 is a tubular shaft 38 in which the forward end of the shaft 23 is telescoped, the construction being such that the driving connection represented by the shafts 38 and 23 may be lengthened or shortened at the will of an operator, to permit the pump casing to be located in any desired position. The shafts 38 and 23 are held together for simultaneous rotation and against lengthwise movement, by means of a set screw 39, threaded into the shaft 38 and engaging the shaft 23. Secured to the forward end of the tubular shaft 38 is a pulley 40 about which is trained a belt 41 engaging a pulley 42 on the shaft of the engine.

It will be obvious that when the shaft of the engine is rotated, rotation will be imparted to the shafts 38 and 23 by means of the pulley 40 and the belt 41, the bracket 32 serving to space the shafts 38 and 23 from the side of the engine, so that the pump casing may be connected with the engine as shown in Fig. 3.

When the shaft 38—23 is rotated in the manner aforesaid, the blades 25 move, in the direction of the arrow A in Fig. 3, within the contour of the wall 9 of the pump casing. Water is pumped into the pump casing through the inlet nipple 20 and is carried around by the blades 25 and forced out through the bore of the neck 11 and through the port 6 into the water jackets of the cylinders of the engine.

The shaft 14 may be rotated by means of the lever 15 or its mechanical equivalent, and may be held in adjusted positions, thereby to adjust the position of the gate 17, and to regulate the amount of water delivered by the pump into the water jackets of the engine cylinders.

The pump as shown in Figs. 3 and 4 of the drawings is of simple and compact construction, and will be found well adapted for the ends in view. The pump, further, is so constructed that it will withstand the severe usage to which structures of this kind are subjected when they form a part of the water circulating system of an automobile engine.

Having thus described the invention, what is claimed is:—

An internal combustion engine including a shaft, and a cylinder having a water jacket port; a pump casing having a short straight neck secured directly to the cylinder and discharging into the port, the casing being provided on its forward side with an inlet; a rotary member mounted in the casing and having blades operating in a plane at right angles to the engine shaft and parallel to the axis of the neck, the rotary member being located opposite to the port whereby the rotary member will force the water directly in a lateral direction tangentially through the neck and in a straight line into the port; a second shaft constituting a part of the rotary member and journaled in the casing, the second shaft being disposed parallel to the engine shaft; means for connecting the second shaft with the engine shaft; a radiator; a connection between the cylinder jacket and the radiator; and a conduit leading from the inlet to the radiator.

In testimony that I claim the foregoing as my own, I have hereto affixed my signature in the presence of two witnesses.

JOSEPH C. BUTLER.

Witnesses:
JAMES E. BURNHAM,
EVERETT H. BOWEN.